April 11, 1939.  E. F. RIESING  2,154,385
RESILIENT COUPLING
Filed Feb. 4, 1937   2 Sheets-Sheet 2
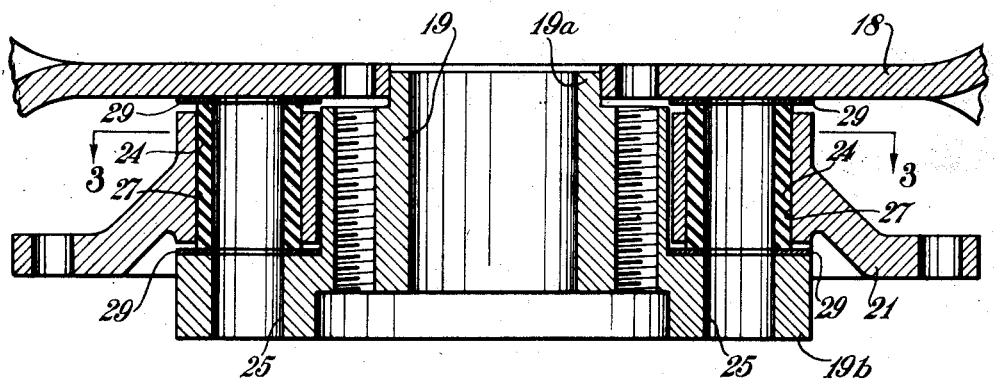
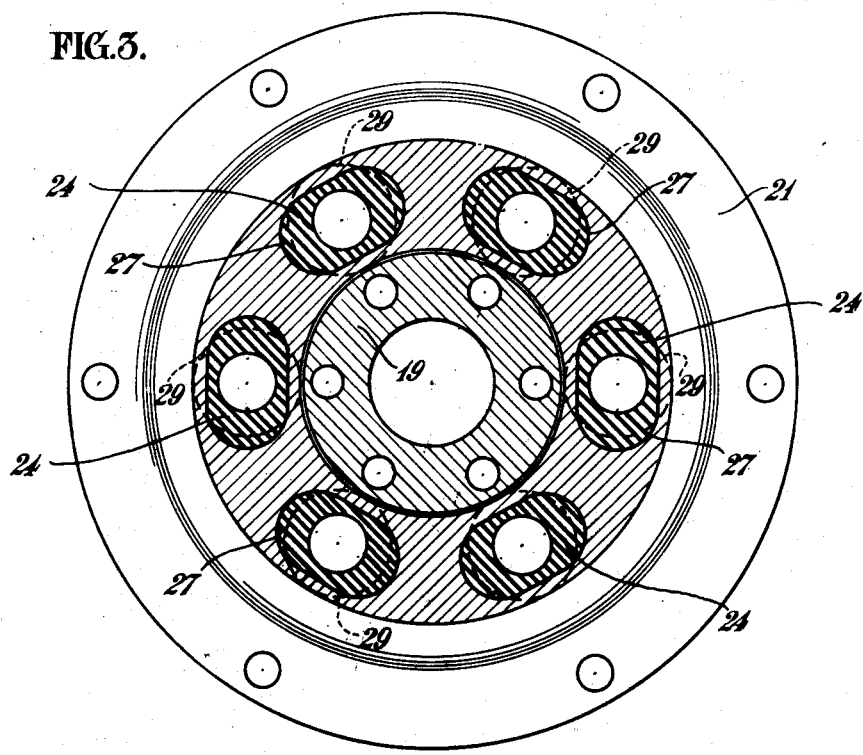
INVENTOR
Ellwood F. Riesing
BY
Albert L. Ely
ATTORNEY Patented Apr. 11, 1939

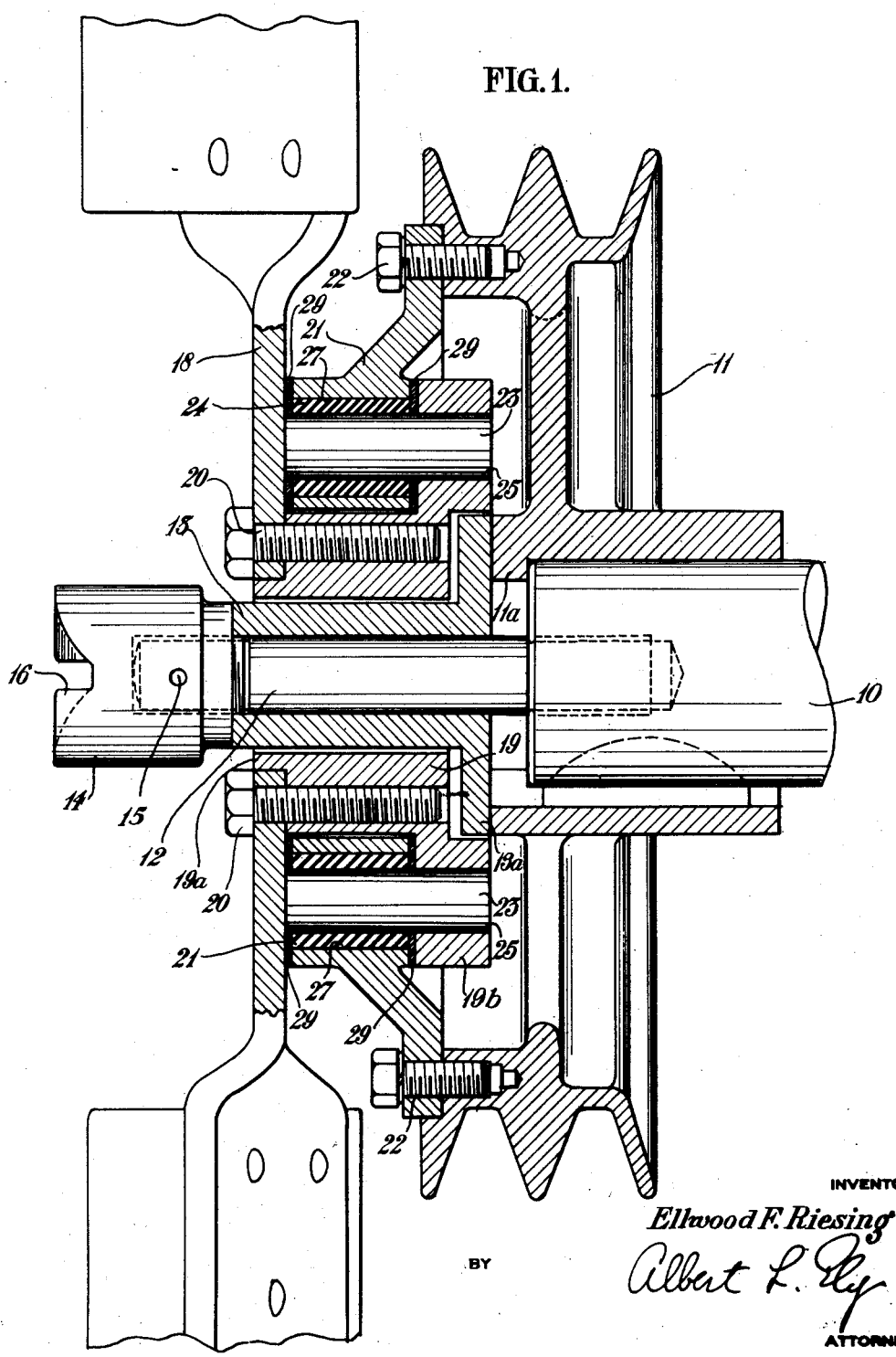

2,154,385

UNITED STATES PATENT OFFICE 2,154,385

RESILIENT COUPLING

Ellwood F. Riesing, Akron, Ohio, assignor to The Firestone Tire & Rubber Company, Akron, Ohio, a corporation of Ohio Application February 4, 1937, Serial No. 124,079

7 Claims. (Cl. 64—27)

This invention relates to resilient couplings and more especially it relates to resilient driving connections adapted to be interposed between driving and driven members, for preventing transmission of vibrations from one of said members to the other.

In the illustrative embodiment of the invention herein shown, the improved coupling is shown in association with the radiator fan of a vehicle motor as a means for preventing torsional vibration of the motor from being transmitted to the fan, and to prevent vibration arising from an unbalanced condition of the fan from being transmitted to the drive shaft of the motor.

The chief objects of the invention are to provide an improved resilient coupling of the type and for the purpose mentioned. More particularly the invention aims to provide a coupling comprising rubber that is not subject to failure due to the separation of rubber and metal; to provide a resilient coupling comprising rubber wherein the latter is so arranged that all vibrations exert a compressive load thereon; to provide for placing the rubber under a normal compressive load as a means for causing it firmly to grip the metal parts with which it is engaged; and to provide a rubber element for use in resilient couplings, which element will offer greater resistance to vibrations of one type than to another. Other objects will be manifest as the specification proceeds.

Of the accompanying drawings:

Figure 1 is a diametric section through the devices carried upon the front end of the drive-shaft of a vehicle motor, showing the improved resilient coupling elements operatively interposed between a radiator fan and said drive-shaft;

Figure 2 is a diametric section through the several elements of a fan assembly, and the improved resilient coupling, as they appear in their proper relative positions, before being bolted together to form a unitary structure; and Figure 3 is a section on a smaller scale, on the line 3—3 of Figure 2.

Referring to Figure 1 of the drawings, there is shown the front end portion 10 of the crank-shaft of a vehicle motor, and keyed upon the front end thereof is the usual driving pulley 11, which, by means of transmission belts (not shown) drives the generator of the vehicle. The front end of the hub of the pulley 11 is formed with an inwardly extending flange 11a that engages the end-face of the crank-shaft 10. Extending forwardly from the end of the latter is an axial extension or spindle 12 of smaller diameter than the crank-shaft, and slidably mounted upon said spindle is a tubular spacer 13, the rear end of which is formed with an outwardly extending circumferential flange 13a that abuts the adjacent hub of the pulley 11. The outer end portion of the spindle 12 is threaded to receive a terminal nut 14 that holds the spacer 13 against the hub of the pulley 11 to prevent axial movement of the latter. After the nut 14 once has been set up, it is secured against further movement relatively of the spindle 12 by means of a pin 15 that extends through nut and spindle. The outer end face of the nut 14 is transversely slotted at 16 for engagement with the usual starting crank by which the crank-shaft may be manually rotated.

The fan structure and the improved resilient couplings constitute an assembly that may be mounted and dismounted as a unit. The fan assembly comprises the fan per se 18, an annular hub 19 to which the fan is secured by set screws 20, 20, an annular plate or disc 21 that is attachable to the pulley 11 by means of a plurality of set screws 22, 22, and a plurality of resilient coupling units providing driving connection between said flange and said hub, each of said coupling units consisting of a cylindrical stud 23 carried by and projecting from the hub 19 and engaged with a bushing 24 of resilient rubber composition carried by the disc 21.

The fan hub 19 is disposed around the spacer 13, the inside diameter of the hub being somewhat larger than the outside diameter of the spacer so as to provide appreciable clearance therebetween. The axial bore of the said hub is counterbored at its rear end to receive the flange 13a of spacer 13, the hub also being spaced from said flange. On its front end the fan hub is formed with a concentric boss 19a that fits within an axial opening in the fan structure, the arrangement relieving the cap screws 20 of the weight of the fan. At its rear end the hub 19 is formed with an outwardly extending circumferential flange 19b that is formed with a plurality of symmetrically arranged transverse apertures 25, 25, Figure 2, herein shown as six in number, in which apertures the respective studs 23 are receivable, with a force fit. The flange 19b is disposed behind the disc 21 in the assembled structure.

The inner peripheral region of the disc 21 is somewhat offset from the outer peripheral region thereof, and is disposed between the hub-flange 19b and the fan structure 18, being somewhat larger than the medial portion of hub 19, which it encircles, so that there is appreciable clearance therebetween. The said inner region of the disc 21 is formed with a plurality of symmetrically arranged through apertures 27, 27 that are in alignment with the respective apertures 25 of the hub flange. Viewed parallel to the axis of the disc, as in Figure 3, the apertures 27 are of prolate shape, the short axis of each aperture being disposed radially of the disc and the long axis being disposed at right angles thereto.

Mounted within each aperture 27 is a tubular rubber bushing 24, the external shape of which is the same as that of the aperture, the size of the bushing being such that it easily may be mounted therein. The bore or aperture in each bushing 24 is centrally positioned and is of such diameter as normally to permit a stud 23 easily to slide thereinto. The normal length of the bushings 24 is somewhat greater than the length of the apertures or sockets 27 in which they are mounted, so that said bushings will project slightly beyond the lateral faces of the disc 21, as shown in Figure 2, in the initial stages of assembly of the fan unit. Mounted at opposite ends of the bushings 24 are respective metal washers 29 that are disposed between the fan structure 18 and the bushings, at one end of the latter, and between the hub flange 19b and the bushings, at the opposite end of the latter. Because of the prolate cross-sectional shape of the bushings 27, the circular washers 29 do not entirely cover the ends of the bushings, as will be observed by reference to Figure 3.

In the assembly of the fan unit, the various elements thereof are positioned as shown in Figure 2. Thereafter the studs 23 are inserted, either from below through the hub-flange 19b or from above while the fan structure 18 is lifted, the studs sliding easily through the bushings 24, washers 29 and apertures 25 in the hub flange. The fan structure 18 is then secured to the hub 19 by means of the set screws 20, and as the latter are tightened to force the fan structure to the fully seated position shown in Figure 1, there is exerted an axially directed compressive force upon opposite ends of the bushings 24. This causes the latter firmly to grip the studs 23 and firmly to engage the walls of the apertures 27. Because the washers 29 do not entirely cover the opposite ends of said apertures, there is space permitting flow of the displaced rubber. The assembled structure is mounted in operative position with relation to the vehicle motor by means of the cap screws 22 by which the disc 21 is secured to the front lateral face of the pulley 11.

The invention provides a resilient driving connection between the disc 21, which has driving connection with the crank shaft 10 through the pulley 11, and the fan 18 and its hub 19. Because of the prolate sectional shape of the bushings 24 and their disposition with relation to the axis of the assembly, said bushings have greater inherent resilience in the direction of rotation of the fan, and thus are better able to absorb torsional vibrations which are always present when the motor is running. They are also able, to a lesser degree, to absorb radial vibration arising from an unbalanced condition of the fan structure, but such condition is not inherent and can be corrected. The presence of the washers 29 at each end of the bushings 24 provides local regions of limited area of metal-to-metal contact between relatively movable elements of the assembly, whereby friction between said elements is reduced and full advantage of the resilient elements is obtained. Because the bushings 24 normally are under compressive stress, nicety of fit initially is not required between the bushings and their sockets or apertures 27, and the bushings and studs 23, with the result that cost of production is reduced and assembly of the unit is facilitated. The construction is such as not to require any bonding of rubber to metal, and the driving elements are so interlocked by the studs 23 as to prevent separation of the elements even though the rubber bushing should disintegrate. Furthermore, the rubber bushings are so enclosed that little or no oil, usually present around a motor, can reach them.

Modification may be resorted to without departing from the spirit of the invention or the scope of the appended claims, which are not limited wholly to the specific construction shown and described.

What is claimed is:

1. In a device of the character described, the combination of a driving element, a driven element in spaced relation thereto, and a resilient coupling providing driving connection between said elements, said coupling comprising a rubber structure that is arranged to absorb radial and torsional vibration by reason of its resistance to compressive load, said rubber structure normally being under compressive load, and a metal structure interposed locally between the confronting faces of the driving and driven elements for restraining said elements against relative axial movement.

2. In a device of the character described, the combination of a rotary driving element, a driven element in spaced relation thereto, one of said elements being formed with a socket, a body of resilient rubber composition mounted in said socket, a member carried by the other of said elements extending into said body of rubber, locally disposed metal spacer members between the confronting lateral faces of the driving and driven elements, and means for forcing the driving element and driven element toward each other, against said spacer members, as a means of placing the rubber body under compressive stress.

3. In a device of the character described, the combination of a rotary driven element, a driving element in spaced relation thereto, the latter being formed with a concentric series of apertures, rubber bushings mounted in the respective apertures, a concentric series of studs carried by the driven element and projecting laterally therefrom into said bushings, and metal washers mounted upon the respective studs, between the driving and driven members, as a means for reducing frictional contact therebetween.

4. In a device of the character described, the combination of a rotary driving element, a driven element in spaced relation thereto, one of said elements being formed with a through aperture constituting a socket, a rubber bushing mounted in said socket and projecting laterally of the ends thereof, a stud projecting laterally from the other element and seating within said bushing, and means for placing the driving element and the driven element in metal-to-metal contact with each other so as to exert normal compressive force upon the projecting end portions of said bushing, and to restrain the said elements against axial movement relatively of each other.

5. In a device of the character described, the combination of an annular disc adapted to be concentrically mounted upon a rotary driving member, said disc being formed with a through aperture constituting a socket, a rubber bushing of greater length than said socket mounted therein, a hub member extending through said disc in spaced relation thereto and having an end flange disposed laterally thereof, a stud carried by said hub flange and extending into said bushing, a driven structure mounted on the other end of said hub and disposed adjacent the other side of said disc, and means for securing said driven structure to the hub in such a manner as to exert compressive force upon the projecting ends of said bushing.

6. A combination as defined in claim 5 including means disposed between the respective ends of the bushing and the driven and hub structures that engage them for maintaining said structures in slightly spaced relation whereby friction is reduced.

7. In a device of the character described, the combination of an annular disc adapted to be concentrically mounted upon a rotary driving member, said disc being formed with a through aperture of prolate shape that constitutes a socket, a rubber bushing of similar shape fitted within said socket, and being of greater length than said socket, a hub member extending through said disc in spaced relation thereto and having one end formed with a flange disposed adjacent one lateral face of the disc, a cylindrical stud carried by said flange and extending centrally into said bushing, a driven structure mounted upon the other end of said hub and disposed adjacent the other lateral face of said disc, means for securing said driven structure to the hub in such a manner as to exert compressive force upon the projecting ends of said bushing, and metal washers disposed between the respective ends of the bushing and the driven and hub structures for maintaining them in slightly spaced relation to obviate friction therebetween, said washers being of such shape as incompletely to cover the bushing ends and thereby to enable displaced rubber to flow past them.

ELLWOOD F. RIESING.